(12) United States Patent
Lee et al.

(10) Patent No.: US 8,583,051 B2
(45) Date of Patent: Nov. 12, 2013

(54) APPARATUS FOR REMOVING INTERFERENCE BETWEEN NEIGHBOR CELLS IN A RADIO COMMUNICATION SYSTEM, AND METHOD FOR SAME

(75) Inventors: Yong Hwan Lee, Seoul (KR); Seung Hwan Lee, Gyeonggi-do (KR)

(73) Assignee: SNU R&DB Foundation, Seoul (KR)

( * ) Notice: Subject to any disclaimer, the term of this patent is extended or adjusted under 35 U.S.C. 154(b) by 318 days.

(21) Appl. No.: 13/057,581

(22) PCT Filed: Aug. 4, 2009

(86) PCT No.: PCT/KR2009/004350
§ 371 (c)(1),
(2), (4) Date: Mar. 15, 2011

(87) PCT Pub. No.: WO2010/016714
PCT Pub. Date: Feb. 11, 2010

(65) Prior Publication Data
US 2011/0183692 A1    Jul. 28, 2011

(30) Foreign Application Priority Data

Aug. 4, 2008 (KR) .................. 10-2008-0076104

(51) Int. Cl.
*H04B 17/00* (2006.01)
(52) U.S. Cl.
USPC ............ 455/67.11; 455/522; 455/69; 455/70; 455/63.1; 455/436; 370/315; 370/316; 370/317; 370/318; 370/319
(58) Field of Classification Search
USPC ............... 455/522, 69–70, 13.4, 67.11, 63.1, 455/436–442; 370/315–320
See application file for complete search history.

(56) References Cited

U.S. PATENT DOCUMENTS 6,834,043 B1 * 12/2004 Vook et al. .................... 370/310
7,813,700 B2 * 10/2010 Zheng et al. ................. 455/63.1
(Continued)

FOREIGN PATENT DOCUMENTS

EP         1 895 728 A1    3/2008
KR    10-2005-0078499 A    8/2005
(Continued)

OTHER PUBLICATIONS

International Search Report for PCT/KR2009/004350 filed on Aug. 4, 2009.
Written Opinion of the International Searching Authority for PCT/KR2009/004350 filed on Aug. 4, 2009.

*Primary Examiner* — Fayyaz Alam

(57) ABSTRACT

The present invention relates to an apparatus for removing interference between neighbor cells in a radio communication system, and to a method for same. The apparatus according to the present invention includes a receiving unit which receives receiving power information and signal-to-noise ratio information of a neighbor cell base station from multiple receiving antennas, a first determination unit for determining the number of major neighbor cell interference signals by using the received receiving power information and the signal-to-noise ratio information, a second determination unit for determining a candidate signal vector of a target signal in accordance with the determined number of major neighbor cell interference signals, the received signal-to-noise ratio, and the number of the multiple receiving antennas, a third determination unit for determining a candidate signal matrix of the major neighbor cell interference signals on the basis of the determined candidate signal vector of the target signal, and an estimation unit for estimating signals transmitted from the target base station or the neighbor base station by applying the determined candidate signal matrix of the major neighbor cell interference signals to the method of maximum likelihood.

16 Claims, 7 Drawing Sheets

(56) References Cited

U.S. PATENT DOCUMENTS

| | | | | |
|---|---|---|---|---|
| 7,924,949 | B2* | 4/2011 | Larsson | 375/340 |
| 2003/0045237 | A1* | 3/2003 | Gardner et al. | 455/63 |
| 2007/0054621 | A1* | 3/2007 | Larsson | 455/67.11 |

FOREIGN PATENT DOCUMENTS

| | | |
|---|---|---|
| KR | 10-2007-0057616 A | 6/2007 |
| KR | 10-2007-0064933 A | 6/2007 |
| KR | 10-0790366 B1 | 12/2007 |

\* cited by examiner

APPARATUS FOR REMOVING INTERFERENCE BETWEEN NEIGHBOR CELLS IN A RADIO COMMUNICATION SYSTEM, AND METHOD FOR SAME

TECHNICAL FIELD

The present invention relates to an apparatus and method for cancelling interference between neighboring cells in a wireless communication system.

BACKGROUND ART

Generally, in a wireless communication system, in particular, in a multi-cell environment in which all cells use the same frequency band, terminals present on the boundary of each cell have a considerably limited system capacity near the cell boundary due to a large number of interference signals from neighboring cells. The reason for the phenomenon whereby performance on the cell boundary is greatly deteriorated in this way is that a Signal-to-Interference-Noise power Ratio (SINR) decreases due to interference between neighboring cells.

In order to solve this problem, research into methods of minimizing the influence of interference signals between neighboring cells has been widely carried out.

In particular, a conventional Minimum Mean Square Error (MMSE) technique is known as a considerably efficient method of mitigating neighboring cell interference signals. However, when such an MMSE technique is applied to a terminal having N receiving antennas, only N−1 interference events can be suppressed. Thus, such a technique is disadvantageous in that it is considerably inefficient in an environment in which a number of neighboring cell interference events equal to or greater than the number of receiving antennas are present.

Meanwhile, a conventional Maximum Likelihood (ML) technique can guarantee optimal reception performance regardless of the number of interference events unlike the MMSE technique, but is disadvantageous in that reception complexity greatly increases according to the number of neighboring cell interference events.

Due to interference between neighboring cells, a terminal located near the boundary of a cell may not receive data, or may have very low spectral efficiency because of its high Packet Error Rate (PER) even if it receives data. In particular, when a user located near the cell boundary is provided with a real-time traffic service that requires a Constant Bit Rate (CBR) and Quality of Service (QoS) related to time delay, high channel coding rate, a low modulation method, and a frequent retransmission rate are required so as to satisfy QoS, thus deteriorating the performance of the entire system.

Accordingly, since services satisfying various types of QoS cannot be supported without increasing the spectral efficiency of users on a cell boundary, an increase in the spectral efficiency of terminals near the cell boundary is essential to the improvement of the performance of the entire system.

SUMMARY OF THE INVENTION

The present invention has been made keeping in mind the above problems occurring in the prior art, and an object of the present invention is to provide an apparatus and method for cancelling interference between neighboring cells in a wireless communication system, which applies only target and interference signal vectors, selected using a Minimum Mean Square Error-Ordered Successive Interference Cancellation (MMSE-OSIC) technique, to a Maximum Likelihood (ML) technique, thus efficiently cancelling interference between neighboring cells.

Another object of the present invention is to provide an apparatus and method for cancelling interference between neighboring cells in a wireless communication system, which applies only target and interference signal vectors, selected using an MMSE-OSIC technique, to an ML technique, thus maintaining performance and reducing reception complexity.

In accordance with an aspect of the present invention to accomplish the above objects, there is provided an apparatus for cancelling interference between neighboring cells, including a receiving unit for receiving reception power information and Signal-to-Noise power Ratio (SNR) information of a neighboring cell base station from multiple receiving antennas, a first determination unit for determining a number of dominant neighboring cell interference signals using the received reception power information and SNR information, a second determination unit for fixing a candidate signal vector of a target signal depending on the determined number of dominant neighboring cell interference signals, the received SNR information, and a number of the multiple receiving antennas, a third determination unit for fixing a candidate signal matrix of the dominant neighboring cell interference signals based on the fixed candidate signal vector of the target signal, and an estimation unit for estimating signals transmitted from a target base station or the neighboring cell base station by applying the fixed candidate signal matrix of the dominant neighboring cell interference signals to a Maximum Likelihood (ML) technique.

The reception unit may receive the reception power information and the SNR information of the neighboring cell base station through a downlink preamble signal, and may receive signals which have been transmitted from the target base station and have been estimated using the ML technique. The first determination unit may obtain the number of the dominant neighboring cell interference signals based on the received reception power information and the received SNR information using equation $$\Omega_0 = \left\{ i \,\middle|\, \frac{\alpha_i^2}{\alpha_1^2} > \zeta, \ i = 1, 2, \ldots, M_C \right\} = \{1, 2, \ldots, M\},$$

where $M_C$ denotes a number of base stations, $\zeta$ denotes a threshold value required to determine the dominant neighboring cell interference signals, and $\alpha_i^2$ denotes the reception power information.

The second determination unit may select $C_0$ candidate signal values of the target signal in an ascending order of Euclidean distances of the candidate signal values when the SNR is less than a threshold value required to determine the dominant neighboring cell interference signals or when the number of the dominant neighboring cell interference signals is equal to or greater than the number of the receiving antennas, and fix a candidate signal vector of the target signal, which includes the selected $C_0$ candidate signal values of the target signal. In contrast, the second determination unit may select a single candidate signal value of the target signal when the SNR is equal to or greater than the threshold value required to determine the dominant neighboring cell interference signals and when the number of the dominant neighboring cell interference signals is less than the number of the receiving antennas, and fix a candidate signal vector of the target signal, which includes the selected single candidate signal value of the target signal.

The third determination unit may select $C_i$ candidate signal values of the neighboring cell interference signals based on the fixed candidate signal vector of the target signal when an SNR of an i-th base station signal is less than the threshold value or when the number of the dominant neighboring cell interference signals is equal to or greater than the number of the receiving antennas, and may fix a candidate signal matrix of the neighboring cell interference signals, which includes the selected $C_i$ candidate signal values of the neighboring cell interference signals. In contrast, the third determination unit may select a single candidate signal value of the neighboring cell interference signals based on the fixed candidate signal vector of the target signal when the SNR of the i-th base station signal is equal to or greater than the threshold value and when the number of the dominant neighboring cell interference signals is less than the number of the receiving antennas, and may fix a candidate signal matrix of the neighboring cell interference signals, which includes the selected single candidate signal value of the neighboring cell interference signals.

The estimation unit may estimate signals transmitted from the target or neighboring cell base station using equation $$\tilde{x} = \arg\min_{\lfloor X_M \rfloor_n} \| r - H_M \lfloor X_M \rfloor_n^T \|^2$$

(n=1, ..., $K_M$) based on the fixed candidate signal matrix $X_i$ of the dominant neighboring cell interference signals, where r denotes a column vector of an N×1 reception signal, $H_M$ denotes $H_M = [h_0 \, \alpha_1 h_1 \ldots \alpha_M h_M]^T$, $h_M$ denotes an independent and identically distributed (i.i.d) N×1 channel vector of an i-th base station, $\alpha_i$ denotes a propagation fading factor of a channel between the base station i and the terminal, and $\tilde{x}$ denotes a row vector having a minimum metric value. In particular, the estimation unit may determine signals transmitted from the target base station using equation $\tilde{x}_0 = [\tilde{x}]_1$, where $[\tilde{x}]_1$ denotes a first column vector of $\tilde{x}$.

In accordance with another aspect of the present invention, there is provided a method of cancelling interference between neighboring cells, including receiving reception power information and Signal-to-Noise power Ratio (SNR) information of a neighboring cell base station from multiple receiving antennas, determining a number of dominant neighboring cell interference signals using the received reception power information and SNR information, fixing a candidate signal vector of a target signal depending on the determined number of dominant neighboring cell interference signals, the received SNR information, and a number of the multiple receiving antennas, fixing a candidate signal matrix of the dominant neighboring cell interference signals based on the fixed candidate signal vector of the target signal, and estimating signals transmitted from a target base station or the neighboring cell base station by applying the fixed candidate signal matrix of the dominant neighboring cell interference signals to a Maximum Likelihood (ML) technique.

The receiving may be configured to receive the reception power information and the SNR information of the neighboring cell base station through a downlink preamble signal. The determining the number of the dominant neighboring cell interference signals may be configured to determine the number of the dominant neighboring cell interference signals based on the received reception power information and the received SNR information using equation $$\Omega_0 = \left\{ i \,\middle|\, \frac{\alpha_i^2}{\alpha_1^2} > \zeta, \quad i = 1, 2, \ldots, M_C \right\} = \{1, 2, \ldots, M\},$$

where $M_C$ denotes a number of base stations, $\zeta$ denotes a threshold value required to determine the dominant neighboring cell interference signals, and $\alpha_i^2$ denotes the reception power information.

The fixing the candidate signal vector of the target signal may be configured to select $C_0$ candidate signal values of the target signal in an ascending order of Euclidean distances of the candidate signal values when the SNR is less than a threshold value required to determine the dominant neighboring cell interference signals or when the number of the dominant neighboring cell interference signals is equal to or greater than the number of the receiving antennas, and fix a candidate signal vector of the target signal, which includes the selected $C_0$ candidate signal values of the target signal. In contrast, the fixing the candidate signal vector of the target signal may be configured to select a single candidate signal value of the target signal when the SNR is equal to or greater than the threshold value required to determine the dominant neighboring cell interference signals and when the number of the dominant neighboring cell interference signals is less than the number of the receiving antennas, and fix a candidate signal vector of the target signal, which includes the selected single candidate signal value of the target signal.

The fixing the candidate signal matrix of the dominant neighboring cell interference signals may be configured to select $C_i$ candidate signal values of the neighboring cell interference signals based on the fixed candidate signal vector of the target signal when an SNR of an i-th base station signal is less than the threshold value or when the number of the dominant neighboring cell interference signals is equal to or greater than the number of the receiving antennas, and fix a candidate signal matrix of the neighboring cell interference signals, which includes the selected $C_i$ candidate signal values of the neighboring cell interference signals. In contrast, the fixing the candidate signal matrix of the dominant neighboring cell interference signals may be configured to select a single candidate signal value of the neighboring cell interference signals based on the fixed candidate signal vector of the target signal when the SNR of the i-th base station signal is equal to or greater than the threshold value and when the number of the dominant neighboring cell interference signals is less than the number of the receiving antennas, and fix a candidate signal matrix of the neighboring cell interference signals, which includes the selected single candidate signal value of the neighboring cell interference signals.

The estimating the signals transmitted from the target or neighboring cell base station may be configured to estimate signals transmitted from the target or neighboring cell base station using equation $$\tilde{x} = \arg\min_{\lfloor X_M \rfloor_n} \| r - H_M \lfloor X_M \rfloor_n^T \|^2$$

(n=1, ..., $K_M$) based on the fixed candidate signal matrix $X_i$ of the dominant neighboring cell interference signals, where r denotes a column vector of an N×1 reception signal, $H_M$ denotes $H_M = [h_0 \, \alpha_1 h_1 \ldots \alpha_M h_M]^T$, $h_M$ denotes an independent and identically distributed (i.i.d) N×1 channel vector of an i-th base station, denotes a propagation fading factor of a channel between the base station i and the terminal, and $\tilde{x}$ denotes a row vector having a minimum metric value. In particular, the estimating the signals transmitted from the target or neighboring cell base station may be configured to determine signals transmitted from the target base station using equation $\tilde{x}_0 = \lceil \tilde{x} \rceil_1$, where $\lceil \tilde{x} \rceil_1$ denotes a first column vector of x.

DESCRIPTION OF REFERENCE NUMERALS OF PRINCIPAL ELEMENTS IN THE DRAWINGS

910: receiving unit
920: first determination unit
930: second determination unit
940: third determination unit
950: estimation unit

BEST MODE

Hereinafter, an apparatus and method for cancelling interference between neighboring cells in a wireless communication system according to embodiments of the present invention will be described in detail with reference to FIGS. 1 to 9.

The present invention proposes a scheme for cancelling interference between neighboring cells. That is, the present invention can estimate a target signal or an interference signal by applying only target and interference signal vectors, which have been selected using a Minimum Mean Square Error-Ordered Successive Interference Cancellation (MMSE-OSIC) technique, to a Maximum Likelihood (ML) technique. In this case, the number of target and interference signal vectors can be determined in consideration of the number of neighboring cell interference signals, the number of receiving antennas, Signal-to-Noise power Ratio (SNR), etc.

Figure 1:
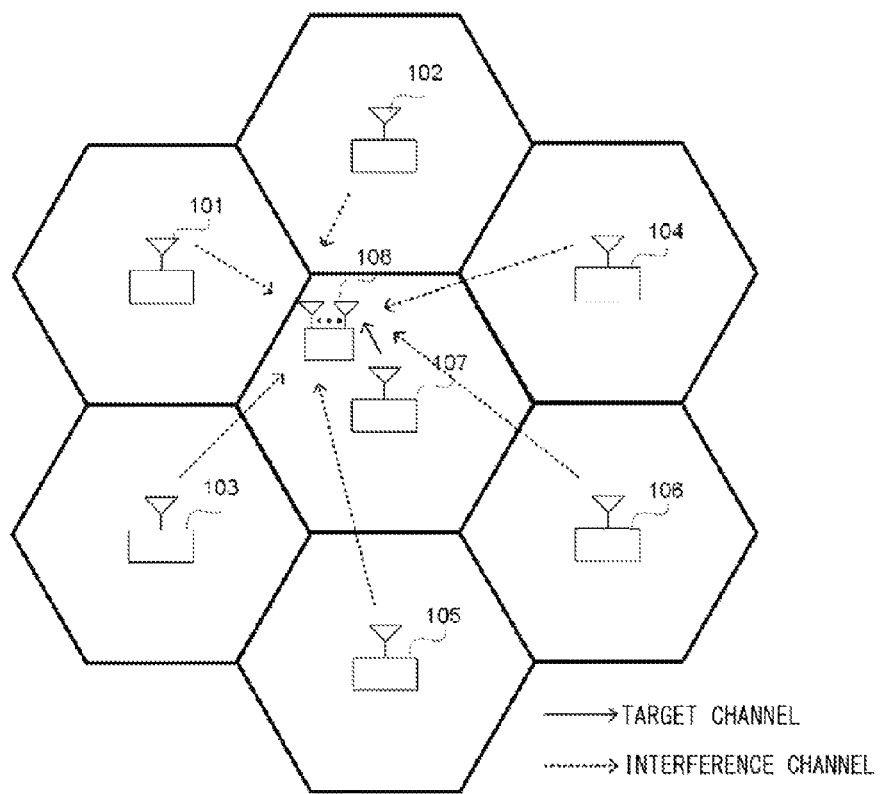
FIG. 1 is a diagram illustrating the cancellation of interference between neighboring cells according to an embodiment of the present invention.

FIG. 1 is a diagram illustrating the cancellation of interference between neighboring cells according to an embodiment of the present invention.

As shown in FIG. 1, the present invention can be considered to be a Single Input Multiple Output (SIMO) cellular system in which each of $M_C$ base stations transmits signals through its single antenna and each terminal receives signals through N antennas. This system can also be applied as a Multiple Input Multiple Output (MIMO) cellular system.

In this case, the N×1 reception signal column vector of a target terminal 108 located on the boundary of a cell, that is, $r = [r_1 r_2 \ldots r_N]^T$ can be represented by the following Equation 1:

$$r = h_0 x_0 + \sum_{i=1}^{M_C - 1} \alpha_i h_i x_i + n, \quad \text{[Equation 1]}$$

$$\alpha_i (0 \leq \alpha_i \leq 1)$$

where $h_0$ denotes an independent and identically distributed (i.i.d) N×1 channel vector of a target base station 107, $h_i$ denotes the i.i.d N×1 channel vector of a base station i, $n = [n_1 n_2 \ldots n_N]^T$ denotes an N×1 Gaussian noise vector having a mean value of 0 and a variance of $\sigma_n^2$, $x_0$ denotes a target signal transmitted from the target base station 107, $x_i$ denotes an interference signal transmitted from the base station i, and $\alpha_i$ denotes the propagation fading factor of a channel between the base station i and the target terminal 108.

For example, if it is assumed that the propagation fading factor $\alpha_0$ of the channel between the target base station 107 and the target terminal 108 is 1, and a threshold value $\zeta$ required to determine dominant neighboring cell interference signals is $(\alpha_{M_C}^2 \leq \ldots \leq \alpha_{M+1}^2) < \zeta < (\alpha_M^2 \leq \ldots \leq \alpha_1^2)$, Equation 1 can be represented by the following Equation 2:

$$r = h_0 x_0 + \sum_{i=1}^{M} \alpha_i h_i x_i + n \quad \text{[Equation 2]}$$

In this case, when a set of dominant interference base stations that influence signals transmitted from the base station i is defined as $\Omega_i$, $\Omega_0$ of the target base station 107 can be represented by the following Equation 3:

$$\Omega_0 = \left\{ i \,\middle|\, \frac{\alpha_i^2}{\alpha_1^2} > \zeta, i = 1, 2, \ldots, M_C \right\} = \{1, 2, \ldots, M\} \quad \text{[Equation 3]}$$

In this case, an MMSE weight vector $w_0$ required to cancel N−1 neighboring cell interference signals and receive signals from the target base station can be represented by the following Equation 4:

$$w_0 = \left[ \sum_{i=1}^{N-1} \alpha_i^2 h_i h_i^* + \left( \sum_{j=N}^{M} \alpha_j^2 h_j h_j^* + \sigma_n^2 I_N \right) \right]^{-1} h_0^* \quad \text{[Equation 4]}$$

where $I_N$ may denote an N×N identity matrix.

Figure 2:
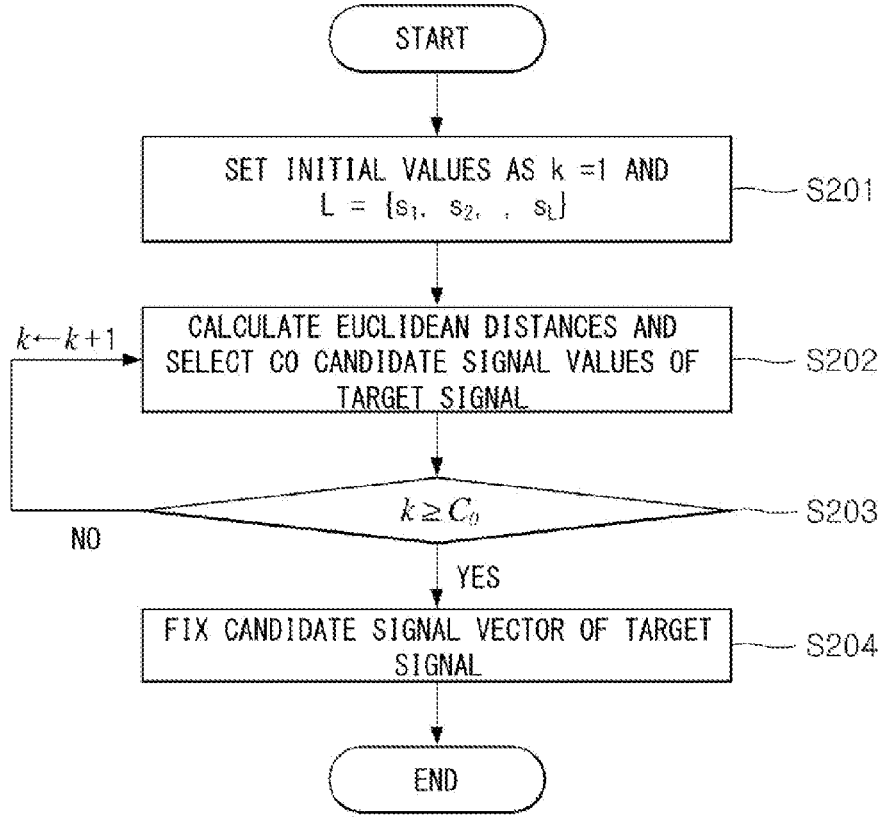
FIG. 2 is a diagram illustrating a method of fixing the candidate signal vector of a target signal according to the present invention.

FIG. 2 is a diagram illustrating a method of fixing the candidate signal vector of a target signal according to the present invention.

As shown in FIG. 2, if it is assumed that the SNR of signals transmitted from a base station i is $$\eta_i \left( \triangleq \alpha_i^2 |h_1|^2 / \sigma_n^2 \right),$$

and a constellation set of the transmitted signals is $L=\{s_1, \ldots, s_L\}$, and that the SNR is less than a threshold value $\delta$ or that the number M of dominant neighboring cell interference signals is equal to or greater than the number N of receiving antennas ($\eta_0 < \delta$ or M=N), Euclidean distances $|w_0 r - s_l w_0 h_0|$ of the signals are calculated, and $C_0$ signals in the ascending order of the calculated values are selected from among the calculated values, and may be defined as the candidate signal vector $x_0$ of the target signal.

That is, the terminal according to the present invention sets initial values of variables as k=1 and $L=\{s_1, s_2, \ldots, s_L\}$ so as to select the candidate signal vector of $C_0$ signals at step S201. Euclidean distances are calculated as given by the following Equation 5, so that the candidate signal vector $x_0$ of the target signal can be updated based on the results of calculation at steps S202 and S203, $$\hat{x}_0^{(k)} = \arg\min_{s_l \in L} |w_0 r - s_l w_0 h_0|, \quad \lfloor x_0 \rfloor_k \leftarrow \hat{x}_0^{(k)}, \quad L \leftarrow L - \{\hat{x}_0^{(k)}\} \quad \text{[Equation 5]}$$

where $\lfloor x_0 \rfloor_k$ denotes the k-th row vector of the candidate signal vector $x_0$ of the target signal.

Figure 3:
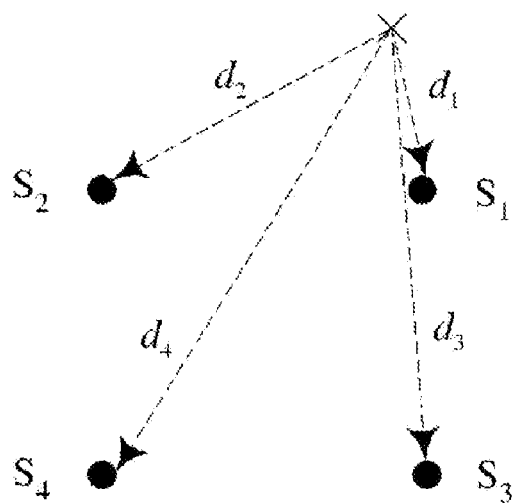
FIG. 3 is a diagram illustrating the principle on which candidate signal values of a target signal are selected according to the present invention.

FIG. 3 is a diagram illustrating the principle on which the candidate signal value of the target signal is selected according to the present invention.

As shown in FIG. 3, when $L=\{s_1, s_2, s_3, s_4\}$, and $C_0=2$, Euclidean distances of signals $s_1, s_2, s_3$, and $s_4$ transmitted from respective base stations are respectively calculated as $d_1, d_2, d_3$, and $d_3$, which can have a magnitude relationship of $d_1 < d_2 < d_3 < d_4$. Therefore, the transmitted signals $s_1$ and $s_2$ can be selected as candidate signal values, which constitute the candidate signal vector of the target signal, according to $C_0$.

In this case, when $k < C_0$, the terminal increases k by 1, that is, $k \leftarrow k+1$, and returns to the previous step to repeatedly perform the same procedure, that is, the procedure of selecting $C_0$ candidate signal values of the target signal. In contrast, when $k \geq C_0$, the candidate signal vector $x_0$ of the target signal can be fixed, as given by the following Equation 6 at step S204, $$x_0 = \begin{bmatrix} \hat{x}_0^{(1)} \\ \vdots \\ \hat{x}_0^{(C_0)} \end{bmatrix} \quad \text{[Equation 6]}$$

where a value in the n-th row of $x_0$, that is, $\lfloor x_0 \rfloor (1 = n = C_0)$ may denote the n-th candidate signal value of $x_0$.

Figure 4:
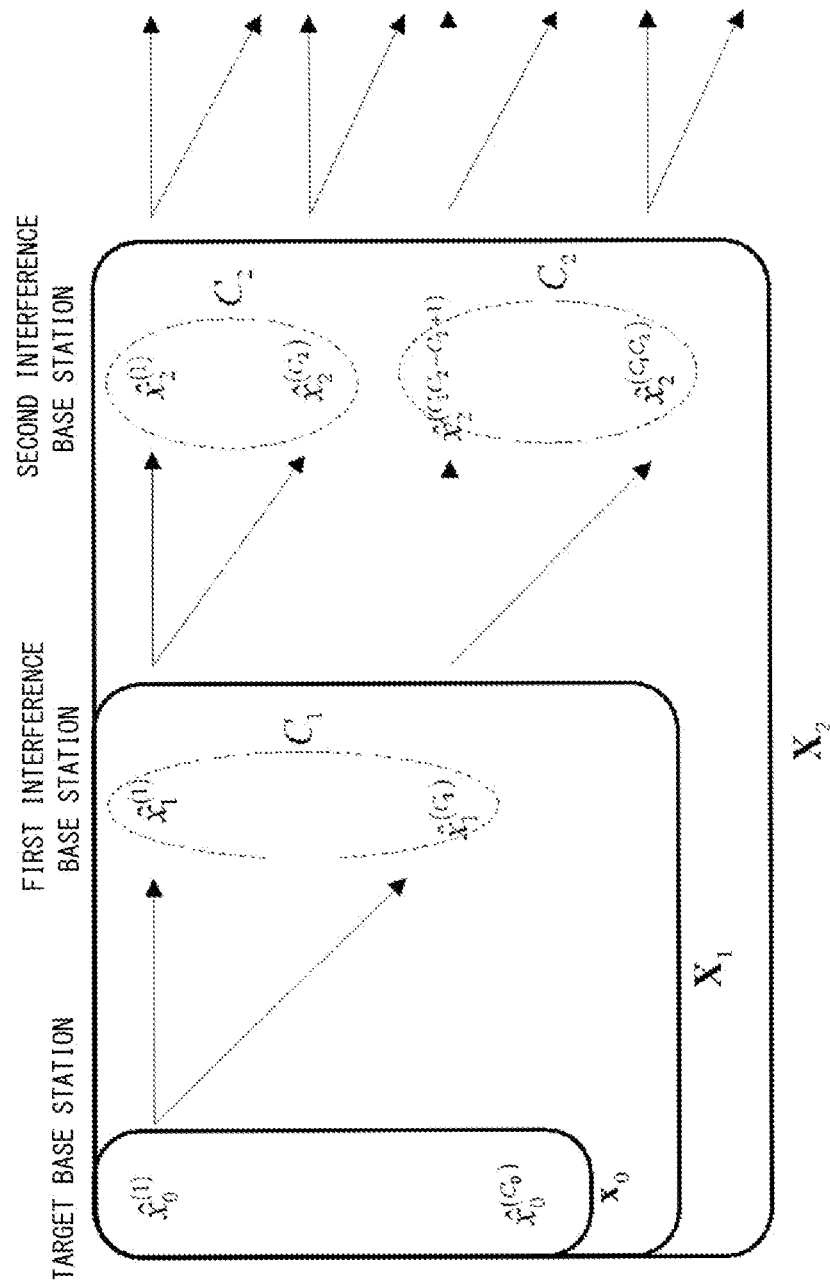
FIG. 4 is a diagram illustrating the principle on which candidate signal values of a neighboring cell interference signal are selected according to an embodiment of the present invention.

FIG. 4 is a diagram illustrating the principle on which candidate signal values of a neighboring cell interference signal are selected according to an embodiment of the present invention.

As shown in FIG. 4, the candidate signal values of a neighboring cell interference signal to be applied to a Maximum Likelihood (ML) technique can be sequentially determined from the candidate signal vector $x_0$ of the target signal that has been obtained from the above-described Equation 6.

This operation will be described in detail. The terminal of the present invention can eliminate the values of a candidate signal matrix $X_{i-1}$ (when i=1, $x_0$) for $(x_0, x_1, \ldots, x_{i-1})$ from a reception signal vector r, as given by the following Equation 7:

$$r_n = r - H_{i-1} \lfloor X_{i-1} \rfloor_n^T \quad \text{[Equation 7]}$$

where $n=1, \ldots, \pi_{j=0}^{i-1} C_j$, $i=1, \ldots, M$, and $H_{i-1} = [h_0 \alpha_1 h_1 \ldots \alpha_{i-1} h_{i-1}]$.

In this case, $\Omega_i$ of the i-th base station having neighboring cell interference signal power $\alpha_i^2$ can be represented by the following Equation 8:

$$\Omega_i = \{i+1, K, M\} \quad \text{[Equation 8]}$$

where the number of dominant neighboring cell interference signals of the signal of the i-th base station is $c(\Omega_i)$, and $c(\Omega_i)$ may denote M−i, that is, the number of elements (cardinality) of the set $\Omega_i$. The candidate signal values of the i-th base station can be determined using a method similar to the procedure of determining the candidate signal values of the target base station.

Figure 5:
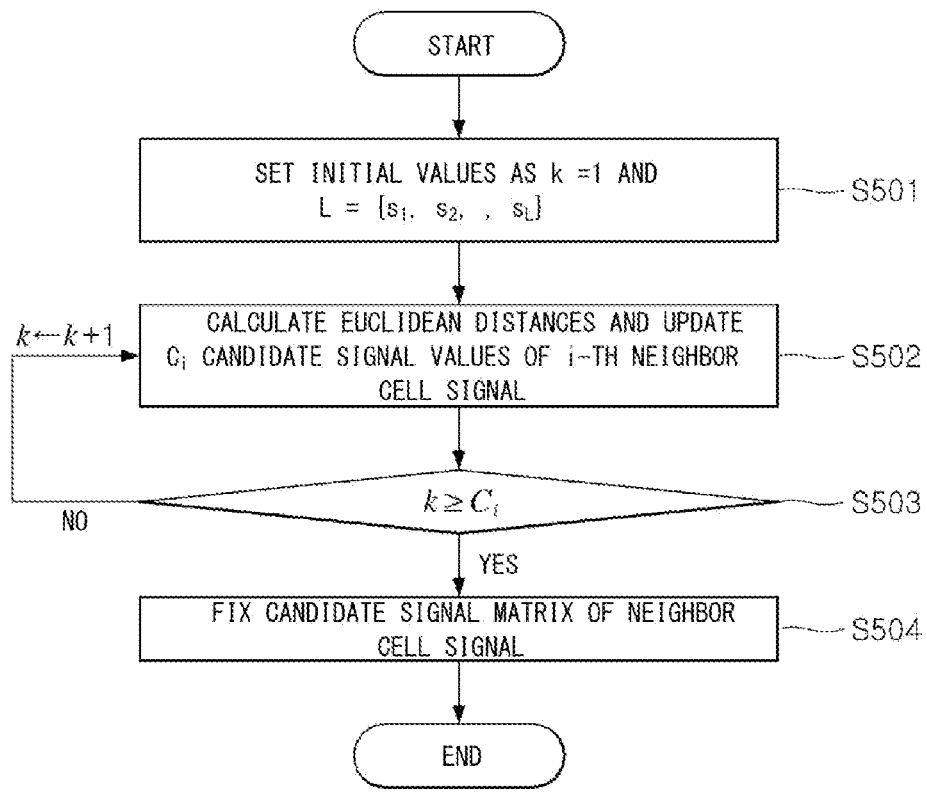
FIG. 5 is a diagram illustrating the principle on which the candidate signal vector of a neighboring cell interference signal is determined according to an embodiment of the present invention.

FIG. 5 is a diagram illustrating the principle on which the candidate signal vector of a neighboring cell interference signal is determined according to an embodiment of the present invention.

As shown in FIG. 5, when SNR is equal to or greater than a threshold value $\delta$, and the number M of dominant neighboring cell interference signals is less than the number N of receiving antennas ($\eta_i \geq \delta$, $c(\Omega_i) \leq N$), only a single signal is selected for all $\pi_{j=0}^{i-1} C_j$ row vectors in $X_{i-1}$, otherwise ($\eta_i < \delta$, $c(\Omega_i) \geq N$) $C_i$ signals can be selected for each of the $\pi_{j=0}^{i-1} C_j$ row vectors.

The terminal of the present invention sets initial values of k and L as k=1 and $L=\{s_1, s_2, \ldots, s_L\}$ at step S501. Euclidean distances are calculated by the following Equation 9, and thus the candidate signal matrix $X_i$ of a target signal can be updated based on the results of calculation at steps S502 and S503, $$\hat{x}_i^{(C_i(n-1)+k)} = \arg\min_{s_l \in L} |w_i r_n - \alpha_i s_l w_i h_i|,$$

$$\lfloor X_i \rfloor_{C_i(n-1)+k} \leftarrow [\lfloor X_{i-1} \rfloor_n \hat{x}_i^{(C_i(n-1)+k)}], \quad L \leftarrow L - \{\hat{x}_i^{(C_i(n-1)+k)}\} \quad \text{[Equation 9]}$$

where $n=1, \ldots, \pi_{j=0}^{i-1} C_j$, and an MMSE weight vector $w_i$ can be represented by the following Equation 10:

$$w_i = \left[ \sum_{l=i+1}^{i+(N-1)} \alpha_l^2 h_l h_l^* + \left( \sum_{m=i+N}^{M} \alpha_m^2 h_m h_m^* + \sigma_n^2 I_N \right) \right]^{-1} \alpha_i h_i^* \quad \text{[Equation 10]}$$

where $i=1, \ldots, M-1$.

In this case, when $k < C_i$, the terminal increases k by 1, that is, $k \leftarrow k+1$, and returns to the previous step to repeatedly perform the same procedure, whereas when $k \geq C_i$, the $K_i \times (i+1)$ candidate signal matrix $X_i$ of signals $x_0, x_1, \ldots, x_i$ can be fixed as given by the following Equation 11 at step S504, $$X_i = \begin{bmatrix} \hat{x}_0^{(1)} & \hat{x}_1^{(1)} & \cdots & \hat{x}_i^{(1)} \\ \hat{x}_0^{(1)} & \hat{x}_1^{(1)} & \cdots & \hat{x}_i^{(2)} \\ \vdots & \vdots & \ddots & \vdots \\ \hat{x}_0^{(1)} & \hat{x}_1^{(C_1)} & \cdots & \hat{x}_i^{(C_1 \cdot C_2 \cdots C_i)} \\ \vdots & \vdots & \ddots & \vdots \\ \hat{x}_0^{(C_0)} & \hat{x}_1^{(C_0 \cdot C_1)} & \cdots & \hat{x}_i^{(C_0 \cdot C_1 \cdot C_2 \cdots C_i)} \end{bmatrix} \quad \text{[Equation 11]}$$

where $K_i = \pi_{j=0}^i C_j$ is satisfied, and the n-th row vector $\lfloor X_i \rfloor_n$ ($1 \le n \le K_i$) of $X_i$ may denote the n-th candidate signal vector of the signals $x_0, x_1, \ldots, x_i$.

In this case, signals from an M-th base station having the final neighboring cell interference signal power $\alpha_M^2$ can be determined using a method similar to the above procedure. However, unlike the previous base stations, all interference signals that influence the signals of the M-th base station have been cancelled (that is, $\Omega_M = \emptyset$), and thus the signals of the M-th base station can be determined using a Maximum Ratio Combining (MRC) weight vector $\hat{w}_M = \alpha_M h_M^* / \sigma \|\alpha_M h_M\|^2$ instead of the MMSE weight vector which suppresses interference signals. The $K_M \times (M+1)$ candidate signal matrix $X_M$ for the signals $x_0, x_1, \ldots, x_i$, which have been determined in this way, can be represented by the following Equation 12.

$$X_M = \begin{bmatrix} \hat{x}_0^{(1)} & \hat{x}_1^{(1)} & \cdots & \hat{x}_M^{(1)} \\ \hat{x}_0^{(1)} & \hat{x}_1^{(1)} & \cdots & \hat{x}_M^{(2)} \\ \vdots & \vdots & \ddots & \vdots \\ \hat{x}_0^{(1)} & \hat{x}_1^{(C_1)} & \cdots & \hat{x}_M^{(C_1 \cdot C_2 \cdots C_M)} \\ \vdots & \vdots & \ddots & \vdots \\ \hat{x}_0^{(C_0)} & \hat{x}_1^{(C_0 \cdot C_1)} & \cdots & \hat{x}_M^{(C_0 \cdot C_1 \cdot C_2 \cdots C_M)} \end{bmatrix}$$ [Equation 12]

where $1 \le n \le K_M$ is satisfied, and the n-th row vector $\lfloor X_M \rfloor_n$ of $X_M$ may denote the n-th candidate signal vector of the signals $x_0, x_1, \ldots, x_M$.

Finally, the present invention applies $X_M$, in the above-described Equation 12 to the Maximum Livelihood (ML) technique, and thus the signals of the target base station and interference base stations in neighboring cells can be estimated as represented by the following Equation 13:

$$\tilde{x} = \arg \min_{\lfloor X_M \rfloor_n} \|r - H_M \lfloor X_M \rfloor_n^T\|^2$$ [Equation 13]

where $n = 1, \ldots, K_M$, $H_M = [h_0 \; \alpha_1 h_1 \; \cdots \; \alpha_M h_M]^T$, and $\tilde{x}$ may denote a row vector having a minimum metric value.

In this case, the signal $\tilde{x}_0$ transmitted from the target base station can be determined by the following Equation 14:

$$\tilde{x}_0 = [\tilde{x}]_1$$ [Equation 14]

where $[\tilde{x}]_1$ may denote the first column vector of $\tilde{x}$.

Hereinafter, the results obtained by comparing the complexity and performance of the present invention with those of conventional techniques will be described. First, from the standpoint of the number of complex multiplications, the complexities of the present invention and the conventional ML technique are analyzed and compared to each other. It is assumed that a value of $C_i$ ($0 \le i \le M$) is fixed regardless of Signal-to-Interference-Noise power Ratio (SINR) and the number of dominant neighboring cell interference signals.

The conventional ML technique may require a complexity of $L^{(M+1)}N(M+2)$. In this case, $L^{(M+1)}NM$ may denote a matrix multiplication and $2L^{(M+1)}N$ may denote a value required for a square operation. In contrast, the present invention may require a computational load of $4M^3 + 2NM^2$ for the pseudo-inverse operation of a matrix, $2(M+1)\pi_{i=0}^M C_i$ for the cancellation of the determined candidate signals, and $N(M+2)\pi_{i=0}^M C_i$ for the calculation of ML in the above-described Equation 13. Therefore, the total complexity of the present invention can be represented by the following Equation 15:

$$\sum_{i=1}^M \{4i^3 + 2Ni^2\} + 2(M+1)\prod_{i=0}^M C_i + N(M+2)\prod_{i=0}^M C_i =$$
$$M^4 + \frac{2}{3}(N+3)M^3 + (N+1)M^2 +$$
$$\frac{1}{3}\left(N + (3N+6)\prod_{i=0}^M C_i\right)M + (2N+2)\prod_{i=0}^M C_i$$ [Equation 15]

The present invention may require a complexity of $O(M^4)$, whereas the conventional ML technique may require $O(L^{M+1})$. That is, when the number of dominant neighboring cell interference signals increases or when the modulation order of transmitted signals increases, the present invention can considerably reduce complexity compared to the conventional ML technique, and this can be represented as shown in the following Table 1.

TABLE 1

| Reception technique | (M, N) = (2, 2) | | (M, N) = 3, 2 | | (M, N) = (4, 2) | |
| --- | --- | --- | --- | --- | --- | --- |
| Proposed technique ($C_0, C_i$) = (2, 1) | 84 | 16% | 564 | 9% | 564 | 4% |
| Proposed technique ($C_0, C_i$) = (3, 1) | 98 | 19% | 586 | 10% | 586 | 5% |
| Proposed technique ($C_0, C_i$) = (4, 1) | 112 | 22% | 608 | 11% | 608 | 5% |
| Proposed technique ($C_0, C_i$) = (2, 2) | 168 | 32% | 1224 | 19% | 1224 | 10% |
| Proposed technique ($C_0, C_i$) = (3, 2) | 224 | 43% | 1576 | 24% | 1576 | 12% |
| Proposed technique ($C_0, C_i$) = (4, 2) | 280 | 54% | 1928 | 30% | 1923 | 15% |
| Conventional ML technique | 512 | | 2560 | | 12288 | |

Further, in the environment given in the following Table 2, the performance of the present invention is evaluated, wherein it is assumed that the channel values of the target and interference base stations can be known using a synchronization signal or a cyclic prefix signal. For the comparison of the performance of the present invention, it is compared to those of two conventional techniques, that is, an MMSE technique and an ML technique. An MRC technique in which neighboring cell interference signals are not taken into consideration can also be compared for reference.

TABLE 2

| | |
| --- | --- |
| Cell structure | 19 cells (3-sector structure) |
| Cell radius | 1 km |
| Antenna configuration | 1 Tx, 2 Rx, (1 × 2) SIMO |
| Cell loading factor | 1 |
| Path loss model | COST 231-Hata Suburban [14] |
| Threshold value ($\zeta$) for determination of dominant neighboring cell interference | 0.2 |
| Threshold value ($\delta$) for SINR | 8 dB |
| Modulation and coding set (MCS) | Profile for code type CTC[10] |
| Channel coding scheme | Convolution turbo code (CTC) |

Figure 6:
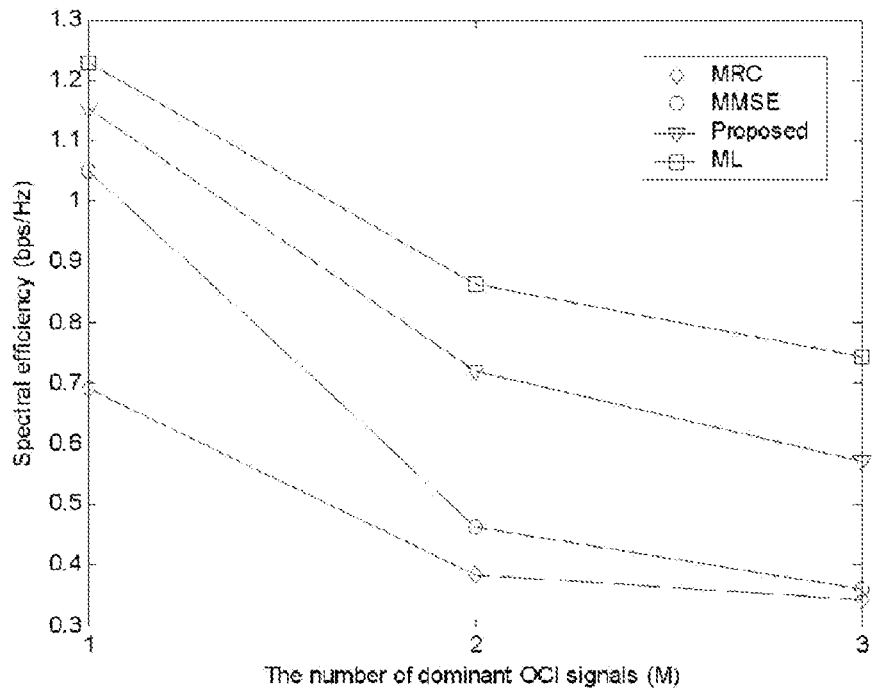
FIG. 6 is a first diagram illustrating experimental results obtained by comparing performance according to an embodiment of the present invention.

FIG. 6 is a first diagram illustrating experimental results obtained by comparing performance according to an embodiment of the present invention.

It can be seen in FIG. 6 that spectral efficiency of the present invention depending on the number of dominant neighboring cell interference signals is shown when SNR is 4 dB, and reception power $\alpha_i^2$ of an i-th base station is $\alpha_i^2 = 0.5$ ($\eta_i \approx 1$ dB).

That is, it can be seen that when M≥N, the performance of the present invention is more excellent than that of the conventional MMSE technique. Further, it can also be seen that the performance of the conventional MMSE technique rapidly decreases compared to that of the present invention when M≥N. The reason for this is that when M≥N, a probability that the MMSE technique will erroneously estimate signals further increases due to the insufficiency of the degree of freedom in reception.

Figure 7:
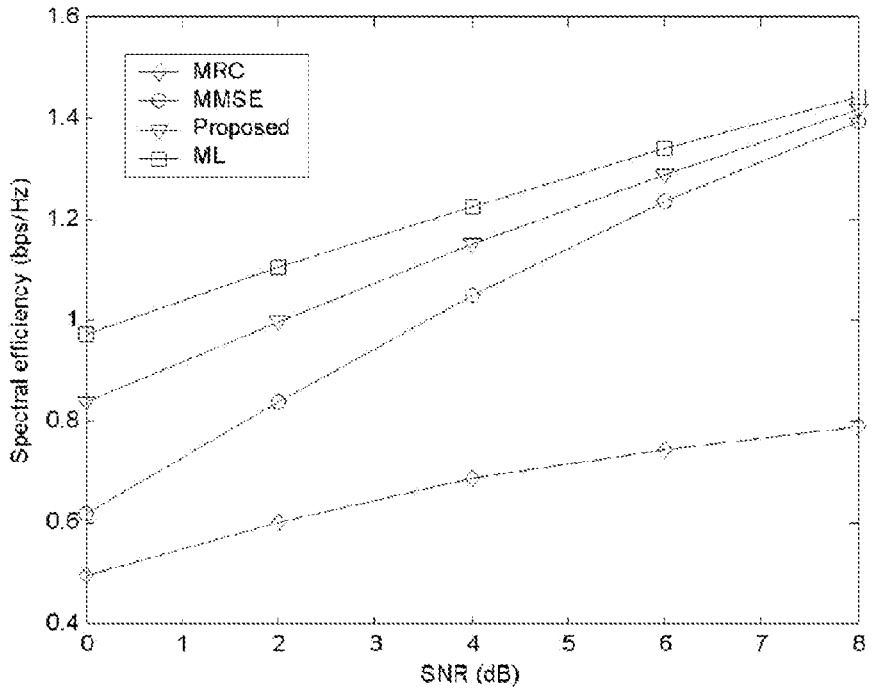
FIG. 7 is a second diagram illustrating experimental results obtained by comparing performance according to an embodiment of the present invention.

FIG. 7 is a second diagram illustrating experimental results obtained by comparing performance according to an embodiment of the present invention.

It can be seen in FIG. 7 that spectral efficiency of the present invention depending on SNR is shown when M=1, and reception power $\alpha_i^2$ of an i-th base station is $\alpha_i^2=0.5$ ($\eta_i \approx 1$ dB).

That is, it can be seen that when SNR is low, the present invention exhibits more excellent performance than the conventional MMSE technique even when M<N. The reason for this is that a probability that the conventional MMSE technique will estimate correct signals even at M<N when SNR is low further decreases.

Figure 8:
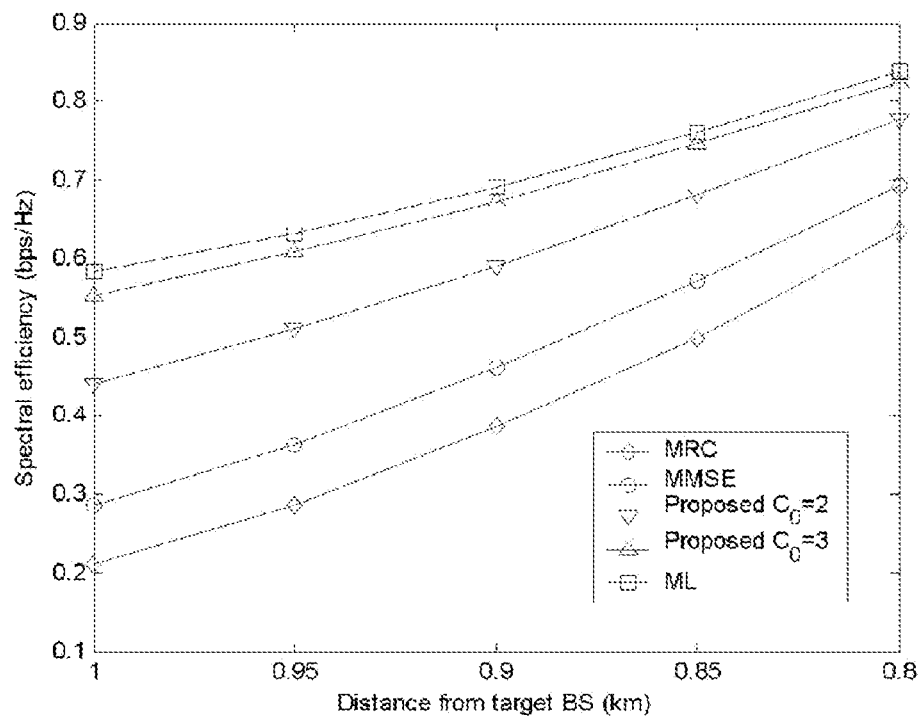
FIG. 8 is a third diagram illustrating experimental results obtained by comparing performance according to an embodiment of the present invention.

FIG. 8 is a third diagram illustrating experimental results obtained by comparing performance according to an embodiment of the present invention.

It can be seen in FIG. 8 that spectral efficiency of the present invention depending on a distance from a target base station is shown. It is assumed that $C_0=2$ or 3 and $C_i=2$ when $\eta_i < \delta$ or when M≥N for $0 \leq i \leq M$.

That is, it can be seen that the present invention is efficient especially in the boundary region of a cell on which SNR is low or dominant neighboring cell interference is present. Further, it can also be seen that the performance of the present invention is almost approximate to the performance of the conventional ML technique as a value of $C_0$ increases while the reception complexity of the present invention can be considerably reduced compared to the conventional ML technique.

As described above, the present invention relates to a technique configured such that a terminal near the boundary of a cell cancels a large number of interference signals resulting from neighboring cells by using multiple antennas in a multi-cell environment that uses the same frequency band, and can considerably reduce reception complexity compared to the conventional ML technique by sequentially coupling a conventional MMSE-OSIC technique and the conventional ML technique to the present invention. Further, the present invention can exhibit performance almost similar to that of the conventional ML technique even at remarkably low reception complexity.

Figure 9:
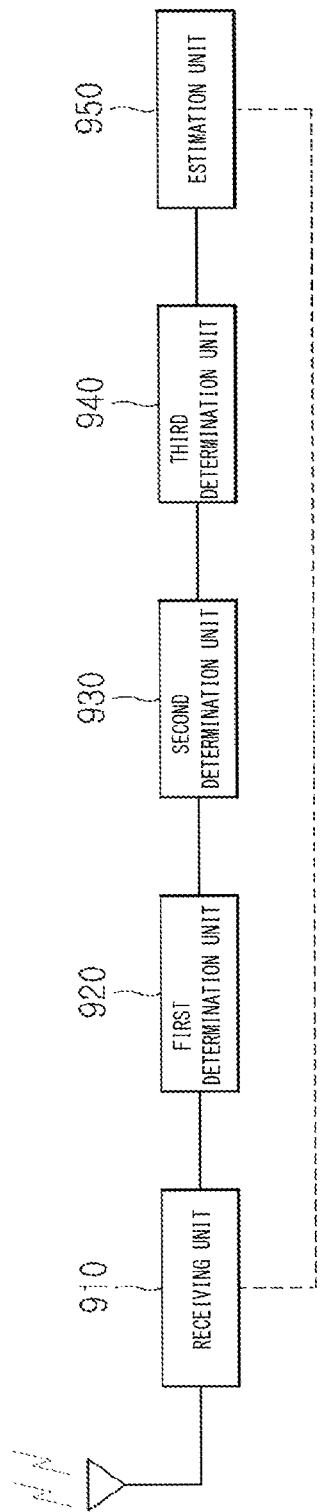
FIG. 9 is a diagram illustrating the construction of a terminal for cancelling interference between neighboring cells according to the present invention.

FIG. 9 is a diagram illustrating the construction of a terminal for cancelling interference between neighboring cells according to the present invention.

As shown in FIG. 9, the terminal of the present invention may include a receiving unit 910 individually connected to multiple receiving antennas, a first determination unit 920, a second determination unit 930, a third determination unit 940, and an estimation unit 950. Such a terminal is a device capable of being provided with a mobile communication service over a mobile communication network, and may be a concept including a mobile phone, a Personal Digital Assistant (PDA), a notebook computer, or the like.

The receiving unit 910 may receive a plurality of reception signals from base stations in neighboring cells through the multiple receiving antennas and may receive, in particular, the reception power information and SNR information of the neighboring cell base stations through a downlink preamble signal. Therefore, the first determination unit 920 can determine the number of dominant neighboring cell interference signals using the reception power information, the SNR information or the like of the neighboring cell base stations, which have been received.

The second determination unit 930 can select a preset number of candidate signal values of a target signal according to, for example, the determined number of dominant neighboring cell interference signals, the SNR information, or the number of the multiple receiving antennas, and can then determine the candidate signal vector of the target signal, which includes the candidate signal values. The third determination unit 940 can select a preset number of candidate signal values of neighboring cell interference signals based on the determined candidate signal vector of the target signal, and can then determine the candidate signal vector of the neighboring cell interference signals, which includes the candidate signal values.

The estimation unit 950 can estimate signals transmitted from the target or neighboring cell base stations by applying the determined candidate signal vector of the neighboring cell interference signals to the maximum likelihood (ML) technique. Further, the terminal of the present invention can receive signals, which have been transmitted from the target base station and have been estimated, through the receiving unit 910.

The function of cancelling interference between neighboring cells disclosed in the present specification may be implemented as computer-readable code on a computer-readable storage medium. The computer-readable storage medium includes all types of recording devices on which data capable of being read by a computer system is stored. Examples of the computer-readable storage medium may include Read Only Memory (ROM), Random Access Memory (RAM), Compact Disc-ROM (CD-ROM), a magnetic tape, a floppy disc, an optical data storage device, etc. Further, the storage medium may also include a carrier wave form (for example, the case provided over the Internet). Furthermore, the computer-readable storage medium may be distributed across computer systems connected to one another over a network and may be stored and executed as computer-readable code in a distributed manner.

The apparatus and method for cancelling interference between neighboring cells in a wireless communication system according to the present invention can be modified and applied in various forms within the scope of the technical spirit of the present invention, and is not limited to those skilled in the art. Further, those embodiments and drawings are only intended to describe the contents of the present invention in detail and are not intended to limit the scope of the technical spirit of the present invention. The above-described present invention can be substituted, modified, and changed by those skilled in the art in various manners without departing from the technical scope of the present invention. Therefore, it is apparent that the present invention is not limited to the above embodiments and attached drawings, and it should be defined by the accompanying claims and equivalents thereof.

The invention claimed is:

1. An apparatus for cancelling interference between neighboring cells, comprising:
    a receiving unit for receiving reception power information and Signal-to-Noise power Ratio (SNR) information of a neighboring cell base station from multiple receiving antennas;

a first determination unit for determining a number of dominant neighboring cell interference signals using the received reception power information and SNR information;

a second determination unit for fixing a candidate signal vector of a target signal depending on the determined number of dominant neighboring cell interference signals, the received SNR information, and a number of the multiple receiving antennas;

a third determination unit for fixing a candidate signal matrix of the dominant neighboring cell interference signals based on the fixed candidate signal vector of the target signal; and an estimation unit for cancelling interference from signals transmitted from the neighboring cell base station by applying the fixed candidate signal matrix of the dominant neighboring cell interference signals to a reception signal vector in accordance with a Maximum Likelihood (ML) technique, wherein the second determination unit selects $C_0$ candidate signal values of the target signal in an ascending order of Euclidean distances of the candidate signal values when the SNR is less than a threshold value required to determine the dominant neighboring cell interference signals or when the number of the dominant neighboring cell interference signals is equal to or greater than the number of the receiving antennas, and fixes a candidate signal vector of the target signal, which includes the selected $C_0$ candidate signal values of the target signal.

2. The apparatus according to claim 1, wherein the receiving unit receives the reception power information and the SNR information of the neighboring cell base station through a downlink preamble signal, and receives signals which have been transmitted from the target base station and have been estimated using the ML technique.

3. The apparatus according to claim 1, wherein the first determination unit obtains the number of the dominant neighboring cell interference signals based on the received reception power information and the received SNR information using equation $$\Omega_0 = \left\{ i \left| \frac{\alpha_i^2}{\alpha_1^2} > \zeta, i = 1, 2, \ldots, M_C \right. \right\} = \{1, 2, \ldots, M\},$$

where $M_C$ denotes a number of base stations, $\zeta$ denotes a threshold value required to determine the dominant neighboring cell interference signals, and $\alpha_i^2$ denotes the reception power information.

4. The apparatus according to claim 1, wherein the second determination unit:

selects a single candidate signal value of the target signal when the SNR is equal to or greater than the threshold value required to determine the dominant neighboring cell interference signals and when the number of the dominant neighboring cell interference signals is less than the number of the receiving antennas, and fixes a candidate signal vector of the target signal, which includes the selected single candidate signal value of the target signal.

5. The apparatus according to claim 1, wherein the third determination unit:

selects $C_i$ candidate signal values of the neighboring cell interference signals based on the fixed candidate signal vector of the target signal when an SNR of an i-th base station signal is less than the threshold value or when the number of the dominant neighboring cell interference signals is equal to or greater than the number of the receiving antennas, and fixes a candidate signal matrix of the neighboring cell interference signals, which includes the selected $C_i$ candidate signal values of the neighboring cell interference signals.

6. The apparatus according to claim 5, wherein the third determination unit:

selects a single candidate signal value of the neighboring cell interference signals based on the fixed candidate signal vector of the target signal when the SNR of the i-th base station signal is equal to or greater than the threshold value and when the number of the dominant neighboring cell interference signals is less than the number of the receiving antennas, and fixes a candidate signal matrix of the neighboring cell interference signals, which includes the selected single candidate signal value of the neighboring cell interference signals.

7. The apparatus according to claim 1, wherein the estimation unit:

estimates signals transmitted from the target or neighboring cell base station using equation $$\tilde{x} = \arg \min_{\lfloor X_M \rfloor_n} \| r - H_M \lfloor X_M \rfloor_n^T \|^2$$

(n=1, ..., $K_M$) based on the fixed candidate signal matrix $X_i$ of the dominant neighboring cell interference signals, where r denotes a column vector of an N×1 reception signal, $H_M$ denotes $H_M = [h_0 \, \alpha_1 h_1 \ldots \alpha_M h_M]$, $h_M$ denotes an independent and identically distributed (i.i.d) N×1 channel vector of an i-th base station, $\alpha_i$ denotes a propagation fading factor of a channel between the base station i and the terminal, and $\tilde{x}$ denotes a row vector having a minimum metric value.

8. The apparatus according to claim 7, wherein the estimation unit determines signals transmitted from the target base station using equation $\hat{x} = \lceil \tilde{x} \rceil_1$, where $\lceil \tilde{x} \rceil_1$ denotes a first column vector of $\tilde{x}$.

9. A method of cancelling interference between neighboring cells, comprising:

receiving reception power information and Signal-to-Noise power Ratio (SNR) information of a neighboring cell base station from multiple receiving antennas;

determining a number of dominant neighboring cell interference signals using the received reception power information and SNR information;

fixing a candidate signal vector of a target signal depending on the determined number of dominant neighboring cell interference signals, the received SNR information, and a number of the multiple receiving antennas;

fixing a candidate signal matrix of the dominant neighboring cell interference signals based on the fixed candidate signal vector of the target signal; and estimating signals transmitted from the neighboring cell base station and cancelling interference by applying the fixed candidate signal matrix of the dominant neighboring cell interference signals to a reception signal vector in accordance with a Maximum Likelihood (ML) technique, wherein the fixing the candidate signal vector of the target signal is configured to select a single candidate signal value of the target signal when the SNR is equal to or greater than the threshold value required to determine the dominant neighboring cell interference signals and when the number of the dominant neighboring cell interference signals is less than the number of the receiving antennas, and fix a candidate signal vector of the target signal, which includes the selected single candidate signal value of the target signal.

10. The method according to claim 9, wherein the receiving is configured to receive the reception power information and the SNR information of the neighboring cell base station through a downlink preamble signal.

11. The method according to claim 9, wherein the determining the number of the dominant neighboring cell interference signals is configured to determine the number of the dominant neighboring cell interference signals based on the received reception power information and the received SNR information using equation $$\Omega_0 = \left\{ i \left| \frac{\alpha_i^2}{\alpha_1^2} > \zeta, i = 1, 2, \ldots, M_C \right. \right\} = \{1, 2, \ldots, M\},$$

where $M_C$ denotes a number of base stations, $\zeta$ denotes a threshold value required to determine the dominant neighboring cell interference signals, and $\alpha_i^2$ denotes the reception power information.

12. The method according to claim 9, wherein the fixing the candidate signal vector of the target signal is configured to:
select $C_0$ candidate signal values of the target signal in an ascending order of Euclidean distances of the candidate signal values when the SNR is less than a threshold value required to determine the dominant neighboring cell interference signals or when the number of the dominant neighboring cell interference signals is equal to or greater than the number of the receiving antennas, and
fix a candidate signal vector of the target signal, which includes the selected $C_0$ candidate signal values of the target signal.

13. The method according to claim 9, wherein the fixing the candidate signal matrix of the dominant neighboring cell interference signals is configured to:
select $C_i$ candidate signal values of the neighboring cell interference signals based on the fixed candidate signal vector of the target signal when an SNR of an i-th base station signal is less than the threshold value or when the number of the dominant neighboring cell interference signals is equal to or greater than the number of the receiving antennas, and
fix a candidate signal matrix of the neighboring cell interference signals, which includes the selected $C_i$ candidate signal values of the neighboring cell interference signals.

14. The method according to claim 5, wherein the fixing the candidate signal matrix of the dominant neighboring cell interference signals is configured to:
select a single candidate signal value of the neighboring cell interference signals based on the fixed candidate signal vector of the target signal when the SNR of the i-th base station signal is equal to or greater than the threshold value and when the number of the dominant neighboring cell interference signals is less than the number of the receiving antennas, and
fix a candidate signal matrix of the neighboring cell interference signals, which includes the selected single candidate signal value of the neighboring cell interference signals.

15. The method according to claim 9, wherein the estimating signals transmitted from the target or neighboring cell base station is configured to:
estimate signals transmitted from the target or neighboring cell base station using equation $$\tilde{x} = \arg \min_{\lfloor X_M \rfloor_n} \| r - H_M \lfloor X_M \rfloor_n^T \|^2$$

(n=1, ..., $K_M$) based on the fixed candidate signal matrix $X_i$ of the dominant neighboring cell interference signals, where r denotes a column vector of an N×1 reception signal, $H_M$ denotes $H_M = [h_0 \, \alpha_1 h_1 \ldots \alpha_M h_M]^T$, $h_M$ denotes an independent and identically distributed (i.i.d) N×1 channel vector of an i-th base station, $\alpha_i$ denotes a propagation fading factor of a channel between the base station i and the terminal, and $\tilde{x}$ denotes a row vector having a minimum metric value.

16. The method according to claim 15, wherein the estimating the signals transmitted from the target or neighboring cell base station is configured to determine signals transmitted from the target base station using equation $\hat{x} = \lceil \tilde{x} \rceil_1$, where $\lceil \tilde{x} \rceil_1$ denotes a first column vector of $\tilde{x}$.

* * * * *